(12) United States Patent
Dirnbeck

(10) Patent No.: US 10,913,311 B1
(45) Date of Patent: Feb. 9, 2021

(54) TIRE AND WHEEL LIFT AND ROTATIONAL ALIGNER

(71) Applicant: Edwin J. Dirnbeck, St. Louis, MO (US)

(72) Inventor: Edwin J. Dirnbeck, St. Louis, MO (US)

( * ) Notice: Subject to any disclaimer, the term of this patent is extended or adjusted under 35 U.S.C. 154(b) by 0 days.

(21) Appl. No.: 16/868,645

(22) Filed: May 7, 2020

(51) Int. Cl.
*B60B 29/00* (2006.01)

(52) U.S. Cl.
CPC .................................. *B60B 29/001* (2013.01)

(58) Field of Classification Search
None
See application file for complete search history.

(56) References Cited

U.S. PATENT DOCUMENTS

| | | | | |
|---|---|---|---|---|
| 1,595,930 A | * | 8/1926 | Sieven | B60B 29/001 29/273 |
| 3,389,453 A | * | 6/1968 | Tarter | B60B 29/001 29/273 |
| 4,602,415 A | * | 7/1986 | Garcia | B60B 29/001 29/273 |
| 5,022,133 A | * | 6/1991 | Weitekamp | B60B 29/001 29/273 |
| 5,367,732 A | | 11/1994 | Suggs | |
| 5,479,692 A | * | 1/1996 | Barkus | B60B 29/001 29/273 |
| 5,562,389 A | | 10/1996 | Mitchell | |
| 6,230,391 B1 | * | 5/2001 | Chilton | H01R 24/46 29/270 |
| 9,440,491 B1 | | 9/2016 | Belliveau | |

FOREIGN PATENT DOCUMENTS

CA  2105036 A1  2/1995

* cited by examiner

*Primary Examiner* — Brian D Keller
(74) *Attorney, Agent, or Firm* — Grace J. Fishel

(57) ABSTRACT

A lift to facilitate changing of a tire and wheel assembly on an automobile, small truck or trailer in the field. The lift includes an elongated rod with a U-shaped socket having a slot and aligned flat to facilitate seating and pivoting of the socket on a lug bolt on an axle-spindle of the vehicle when passed through one of the bolt holes in the tire rim. A handle is provided on the opposite end of the elongated rod by which an operator may lift the tire using the lever principle while rotating the assembly such that the bolt holes in the rim align with the lug bolts. A slide on the elongated rod serves as a stop to control sliding of the tire and wheel assembly towards the operator during the lifting operation.

6 Claims, 4 Drawing Sheets

TIRE AND WHEEL LIFT AND ROTATIONAL ALIGNER

BACKGROUND OF THE INVENTION

Field of the Invention

A lift for a tire and wheel assembly that facilitates changing of the tire and wheel assembly on automobiles, small trucks and trailers in the field and that utilizes the lever principle to lift the tire and wheel assembly and align holes in the tire rim with the lug bolts in the vehicle's axle-spindle.

Brief Description of the Prior Art

When a tire and wheel assembly is replaced in the field, the vehicle is raised on a jack so that the wheel and tire assembly being replaced is suspended off the ground. The new tire and wheel assembly must be lifted from the ground to align the lug bolts of the axle-spindle on the vehicle with holes in the rim of the wheel. On many vehicles, the lug bolts are recessed within the wheel well surrounded by the vehicle body such that lifting of the tire and wheel assembly must be performed from an awkward position. When a person doing the task is kneeled down, holding a wheel and tire assembly which may weight 50 pounds or more at an angle and at arm's length, the risk of injury is high.

The prior art tire and wheel assembly lifts which simplify the above-mentioned process are heavy and cumbersome. They appear to be primarily used to move and position tire and wheel assemblies in garages. But frequently the need to change a wheel and tire assembly occurs while driving the vehicle on a road. A need therefore exists for a lift for a tire and wheel assembly that is simple, light weight and can be stored in a vehicle ready for use in the field when needed.

BRIEF SUMMARY OF THE INVENTION

In view of the above, it is object to provide a tire and wheel lift and rotational aligner that may be used in the field and can be easily stored in a vehicle ready for use. Another object is to provide a lift that minimizes the chance of operator injury in changing a tire and wheel assembly on a vehicle raised on a jack. A still further object is to provide a lift which may be used when the axle-spindle with the lug bolts are recessed within a wheel well surrounded by the vehicle body. Other objects and features of the lift will be in part apparent and in part pointed out hereinafter.

In accordance with the above, a tire and wheel lift and rotational aligner includes an elongated rod with a U-shaped socket with a slot at a first end with a flat aligned with the slot to facilitate seating and pivoting of the socket on a lug bolt. In an embodiment, the socket has substantially smooth internal sidewalls and an internal diameter configured to accommodate the thread diameter of the lug bolts used on the vehicle's axle-spindle. In particular, the objects may be achieved, for example, with a 24" socket extension with a ½" socket reamed out such that it has substantially smooth internal sidewalls or with an equivalent structure formed in another manner.

In some embodiments, the elongated rod is outfitted with a sleeve slidable on the elongated rod with a screw, such as a thumb screw, that can be tightened to retain the sleeve along the elongated rod as desired. In other embodiments, the elongated rod and socket are formed of alloyed steel such as chrome vanadium steel and a handle is attached at a second end of the elongated rod. Other times the handle is also formed of metal and is cylindrical with a central bore and a set screw for attaching the handle to the elongated rod.

The lift summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which one of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 6:
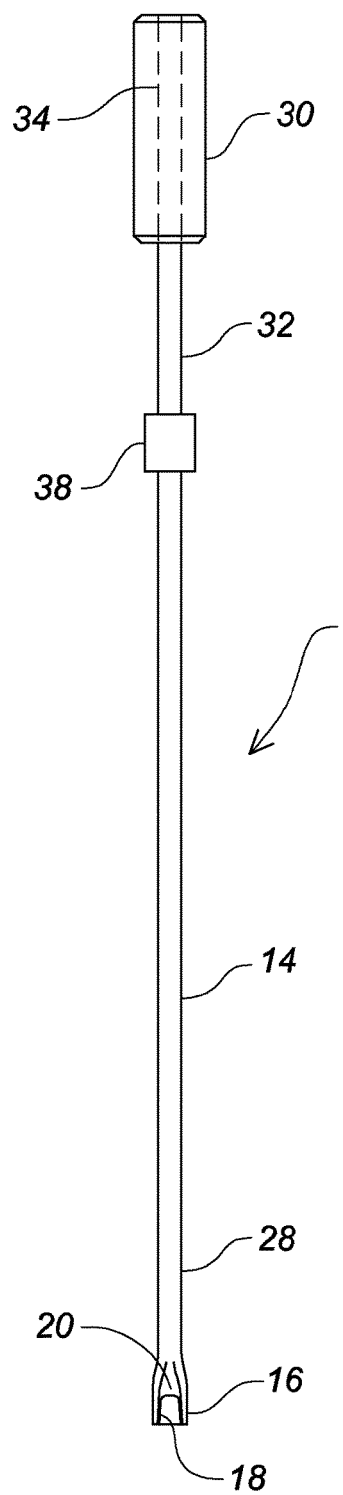
FIG. 6 is a plan view of the lift for a tire and wheel assembly showing a slot in the U-shaped socket with an aligned flat.
Figure 7:
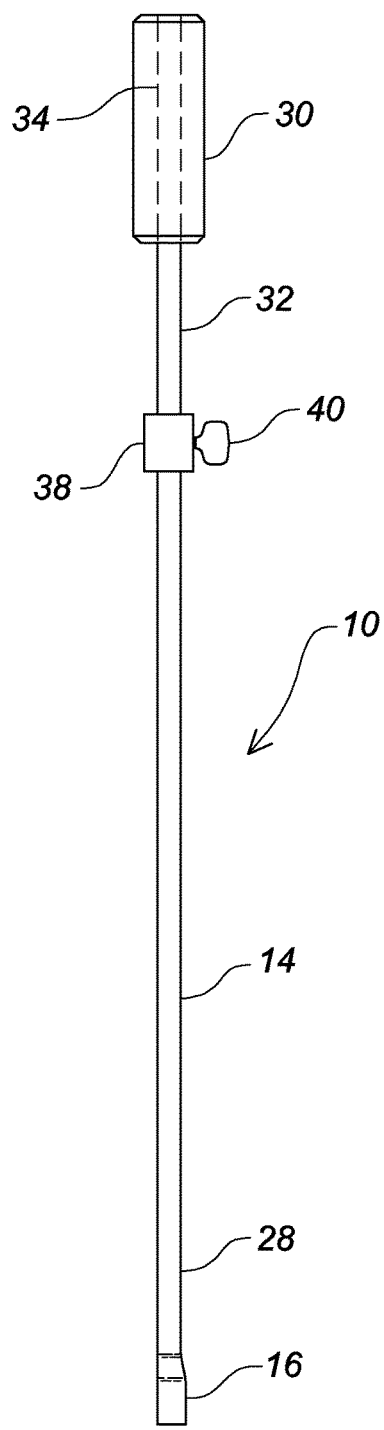
FIG. 7 is a side elevation of the lift for a tire and wheel assembly.
Figure 8:
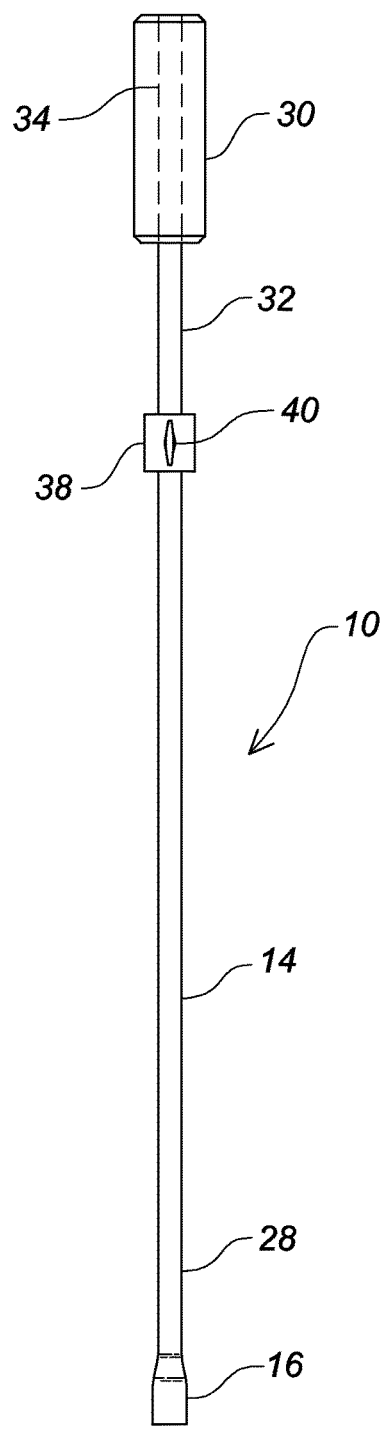
FIG. 8 is plan view of the lift for a tire and wheel assembly viewing the socket opposite the slot in the U-shaped socket.

Referring to the drawings more particularly by reference character as best seen in FIGS. 6-8, a lift 10 for a tire and wheel assembly 12 includes an elongated rod 14 with a U-shaped socket 16. Elongated rod 14 and socket 16 are formed of steel, preferably an alloy steel such as chrome vanadium steel. The U-shaped socket 16 has substantially smooth internal sidewalls with a slot 18 and an aligned flat 20 and an internal diameter to accommodate the thread diameter of the lug bolts 22 on an axle-spindle 24 of a vehicle 26. While lug nuts differ widely between vehicles, the most common sizes for the lug bolts 2 typically are ⁷⁄₁₆", ½", ⁹⁄₁₆" and ⅝" common or 10 mmm, 12 mm, 14 mm, etc. As shown in FIGS. 6-8, elongated rod 14 and socket 16 are formed from a 24" extension with a ½" socket formed at first end 28. A lift 10 that may be used with many lug bolts found on automobiles, small trucks and trailers is formed by reaming the ½" socket out and forming a ⅜" slot 18 and aligned flat 20 with a handle 30 attached at a second end 32. Other lifts 10 may be provided with sockets 16 matching the size of lug bolts 22 found on the particular vehicle.

Handle 30 is cylindrical with a central bore 34 for receipt of second end 32 of elongated rod 14. Handle 30 may be fixed on rod 14 with a set screw 36 or the like and may be knurled or the like for improved grip. A sleeve 38 is provided on elongated rod 14 for use as described below. Sleeve 38 is slidable along elongated rod 14 with a thumb screw 40 threadably carried in sleeve that can be tightened to retain sleeve 38 along rod 14 as desired. As will be apparent from the above, lift 10 is simple, light weight and can be stored in a vehicle ready for use when required.

Figure 1:
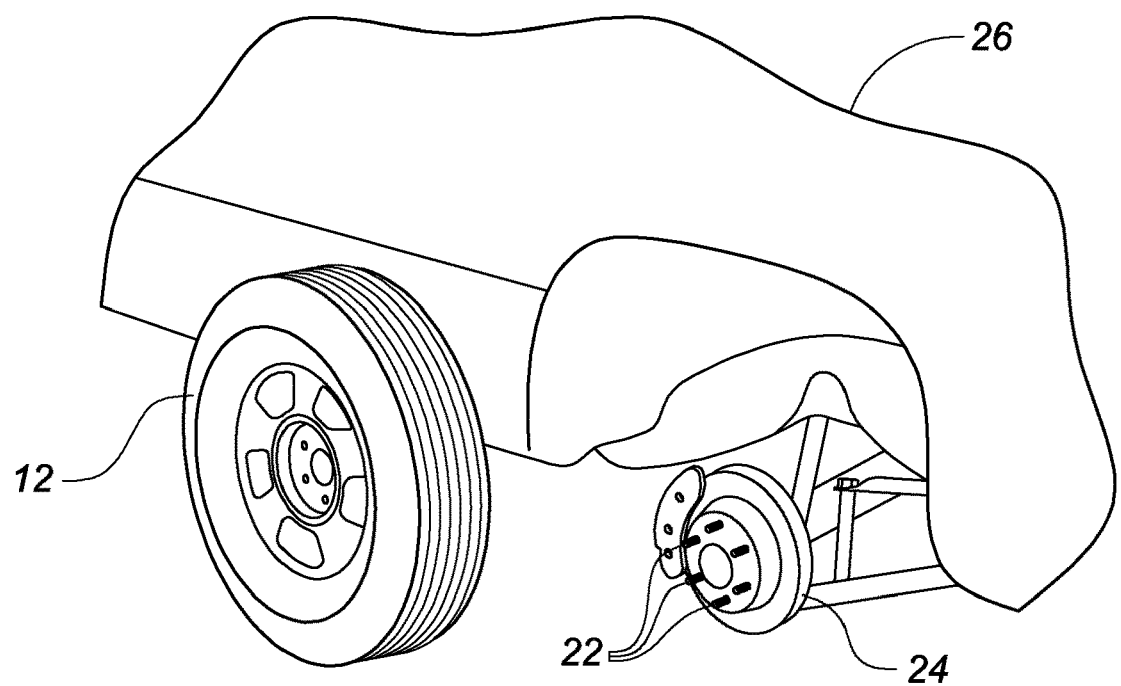
FIG. 1 is a perspective view of an axle-spindle recessed inside the wheel well of a vehicle with a replacement tire and wheel assembly ready for installation, a jack for supporting the vehicle has been omitted for clarity.
Figure 2:
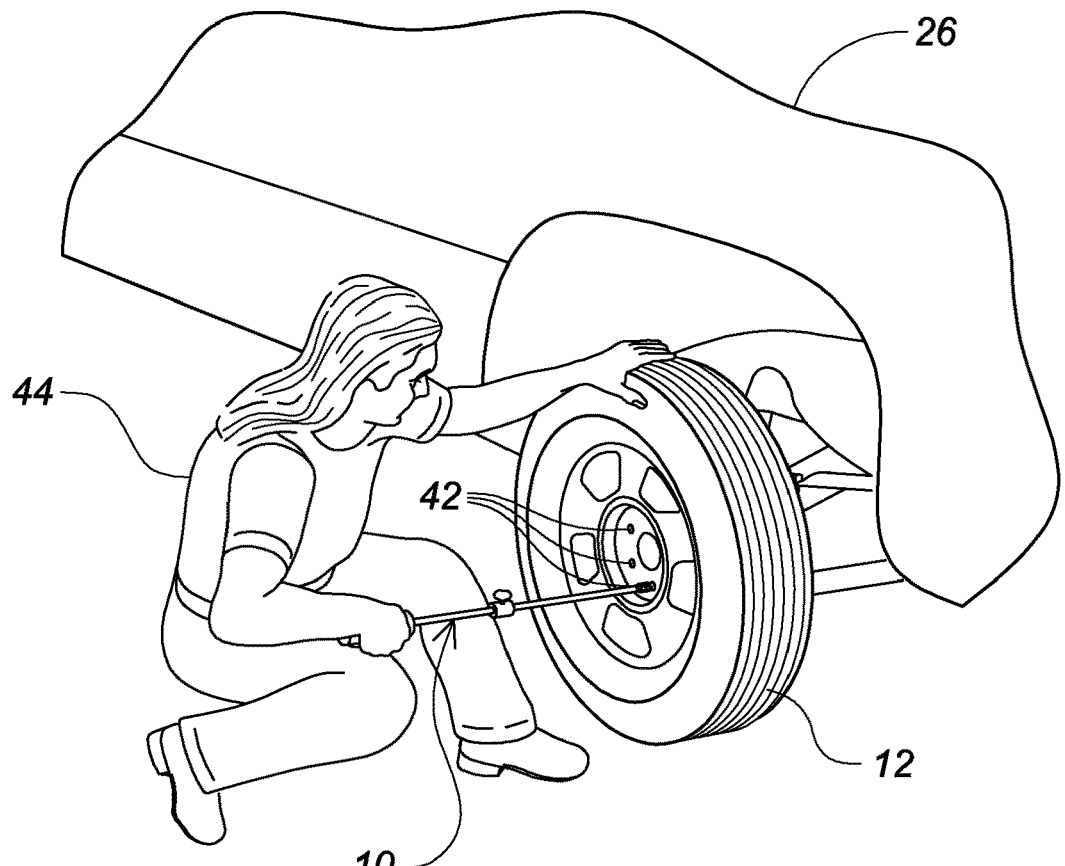
FIG. 2 is a perspective view of an operator shown operating a lift for a tire and wheel assembly with her right hand and rotating the tire and wheel assembly with her left hand.
Figure 3:
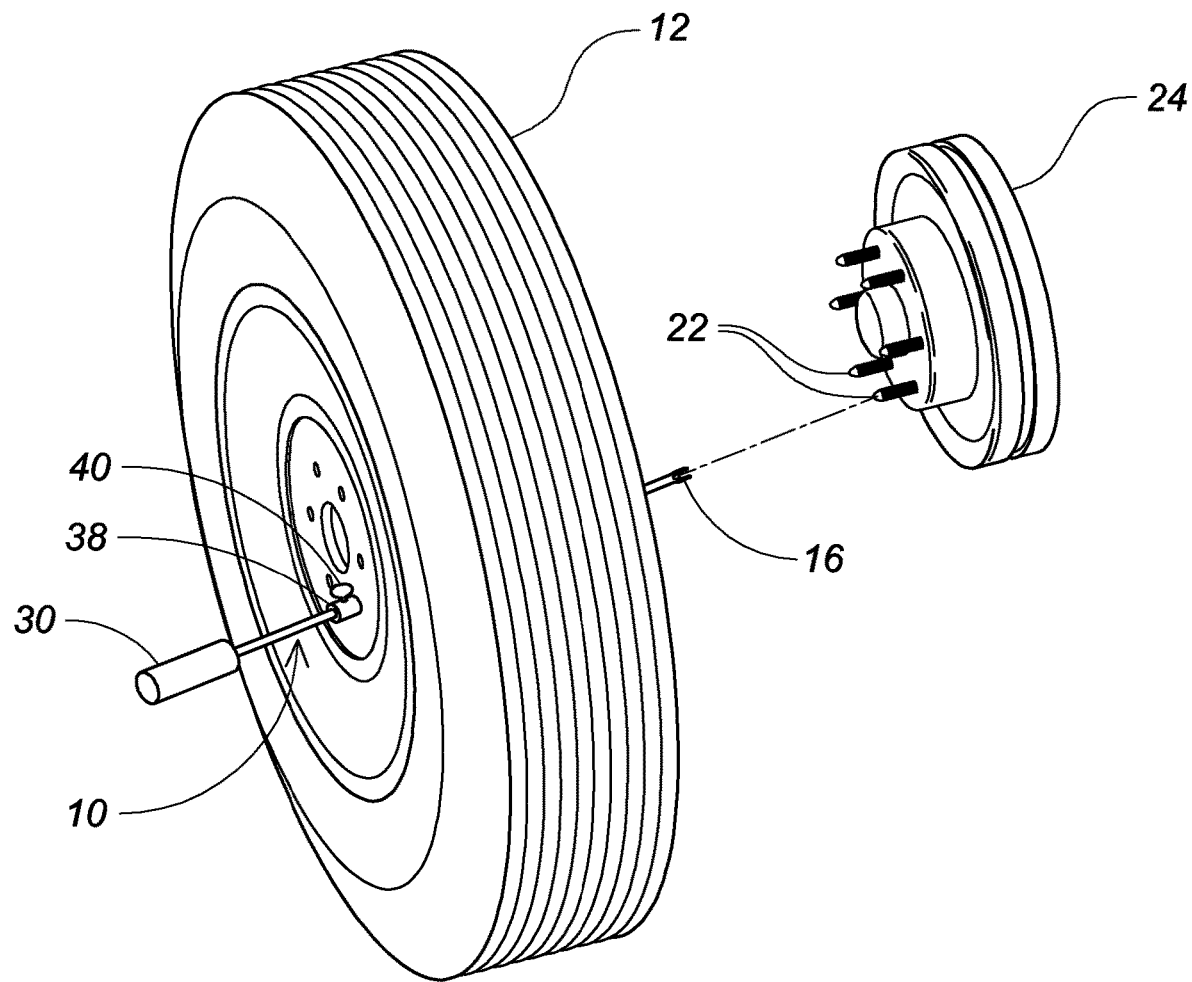
FIG. 3 is a perspective of the lift for a tire and wheel assembly including a elongated rod with a U-shaped socket at one end and a handle at the other end shown with the socket passed through one of the holes in the rim of the tire and wheel assembly.
Figure 4:
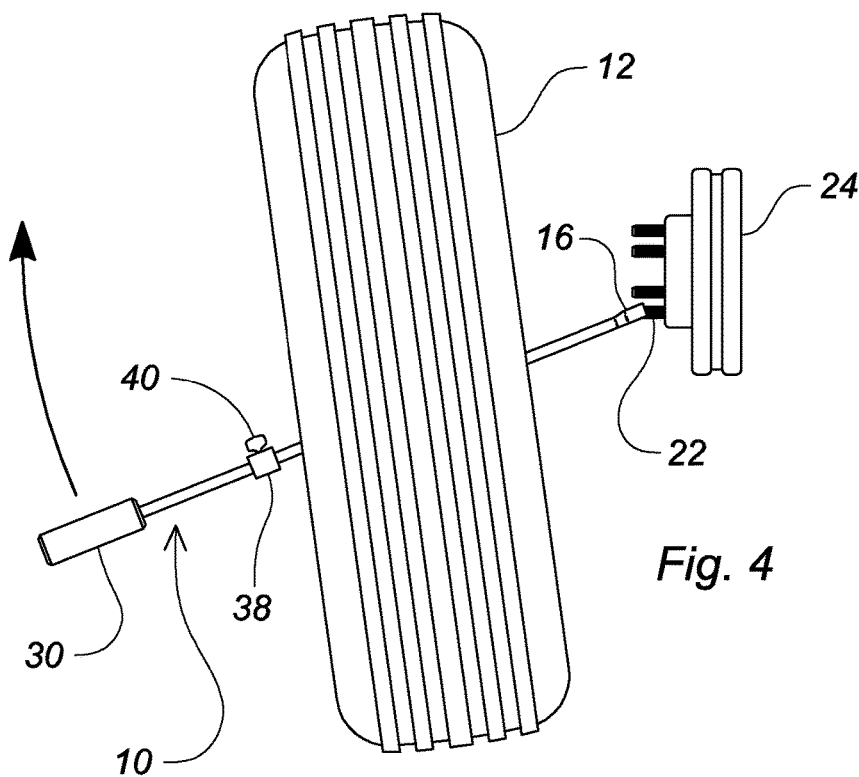
FIG. 4 is a side elevation showing the lift for a tire and wheel assembly with the socket seated on a lower lug bolt of the axle-spindle.
Figure 5:
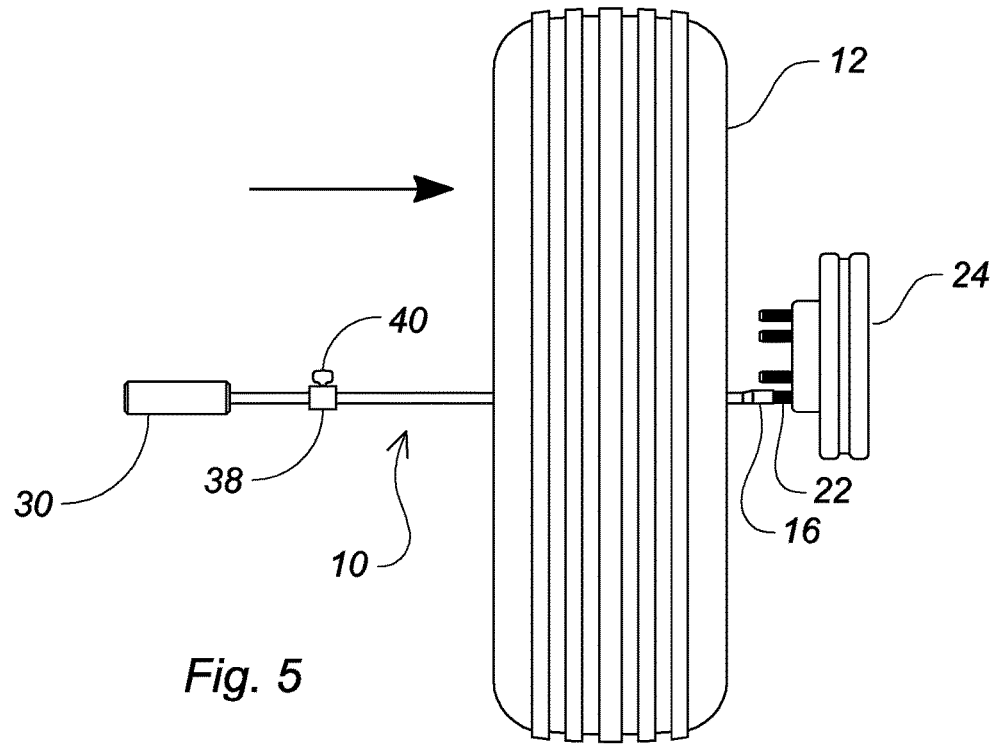
FIG. 5 is a side elevation showing the lift for a tire and wheel assembly with the socket pivoted on one of the lower lug bolts such all of the holes in the rim may be aligned with the lug bolts ready for securing the tire and wheel assembly to the axle-spindle with lug nuts.

Turning now to FIGS. 1-5, lift 10 is shown in use in the field changing the tire and wheel assembly 12 on a vehicle 26 supported on a jack (not shown). As shown in FIG. 2, socket 16 is inserted through a bolt hole 42 in the rim of the tire and wheel assembly 12 and is directed towards a lower lug bolt 22 on axle-spindle 24 as shown in FIG. 3. With socket 16 seated on lug bolt 22 as shown in FIG. 4, an operator 44 using the lever principle may use one hand to lift tire and wheel assembly 12 the 3 to 6 inches needed to bring it into position for attachment to axle-spindle 24 while rotating the assembly with the other hand such that all of bolt holes 42 in the rim align with lug bolts 22. During lifting, sleeve 38 may be used as a stop to prevent tire and wheel assembly 12 from sliding down rod 14 and against handle 30 and the operator's hand. With tire and wheel assembly 12 in position on lug bolts 22, the wheel is attached to vehicle by tightening appropriate lug nuts (not shown) on lug bolts 22 easily completing the tire and wheel changing procedure.

In view of the above, it will be seen that the several objects are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A wheel lift and rotational aligner comprising an elongated rod with a socket with a U-shaped slot at a first rod end, said socket having smooth internal sidewalls and an internal diameter configured to accommodate a thread diameter of a lug bolt, said socket having an outside diameter greater than an outside diameter of the rod, said rod having a flat on the rod in alignment with the U-shaped slot in the socket and extending across a side of the socket to facilitate seating and pivoting of the socket on the lug bolt, a sleeve slidable on the elongated rod with a screw threadably carried in the sleeve that can be tightened to retain the sleeve along the rod as desired.

2. The lift of claim 1 wherein the elongated rod is 24" long and the internal diameter of the socket is ½" and the slot is ⅜" wide.

3. The lift of claim 1 wherein the elongated rod and socket are formed of alloyed steel.

4. A wheel lift and rotational aligner comprising an elongated rod with a socket with a U-shaped slot at a first rod end and a handle at a second rod end, said socket having smooth internal sidewalls and an internal diameter configured to accommodate a thread diameter of a lug bolt, said socket having an outside diameter greater than an outside diameter of the rod, said rod having a flat on the rod in alignment with the U-shaped slot in the socket and extending across a side of the socket to facilitate seating and pivoting of the socket on the lug bolt, a sleeve slidable on the elongated rod with a thumb screw threadably carried in the sleeve that can be tightened to retain the sleeve along the rod as desired, said handle being cylindrical with a central bore for receipt of the second rod end of the elongated rod with a set screw for attaching the handle to the elongated rod.

5. The lift of claim 4 wherein the elongated rod is 24" long and the internal diameter of the socket is ½" and the slot is ⅜" wide.

6. The lift of claim 4 wherein the elongated rod and socket are formed of alloyed steel and the handle is formed of metal.

* * * * *